United States Patent [19]

Gohara et al.

[11] Patent Number: 4,730,591

[45] Date of Patent: Mar. 15, 1988

[54] FUEL SUPPLYING SYSTEM OF OUTBOARD MOTOR

[75] Inventors: Yoshihiro Gohara; Yoshikazu Nakayasu, both of Hamatsu, Japan

[73] Assignee: Sanshin Kogyo Kabushiki Kaisha, Japan

[21] Appl. No.: 900,751

[22] Filed: Aug. 27, 1986

[30] Foreign Application Priority Data

Aug. 30, 1985 [JP] Japan ................................ 60-189796

[51] Int. Cl.⁴ ................................................ G05D 7/00

[52] U.S. Cl. ................................ 123/510; 123/65 R; 123/434; 137/39

[58] Field of Search .................... 137/38, 39; 141/192, 141/208; 123/65 R, 434, 510, 198 D, 198 DB

[56] References Cited

U.S. PATENT DOCUMENTS 1,271,434 7/1918 Claudel ................................ 137/39

2,109,179 2/1938 Michael ............................ 137/38 X 4,436,219 3/1984 Reutter ........................ 220/DIG. 33

4,625,688 12/1986 Takayasu .......................... 123/73 B

FOREIGN PATENT DOCUMENTS 1049135 11/1966 United Kingdom ................ 141/208

*Primary Examiner*—Mark J. Thronson

*Attorney, Agent, or Firm*—Ernest A. Beutler

[57] ABSTRACT

Several embodiments of outboard motor fuel feed systems wherein a position responsive valve is interposed between a remotely positioned fuel tank and the engine charge former for precluding the inadvertant flow of fuel to the charge former when the outboard motor is tilted up. In each embodiment, the valve is a gravity responsive valve and in another embodiment a pressure responsive valve member is provided for ensuring fuel flow when the outboard motor is again tilted down to its normal running position.

9 Claims, 9 Drawing Figures

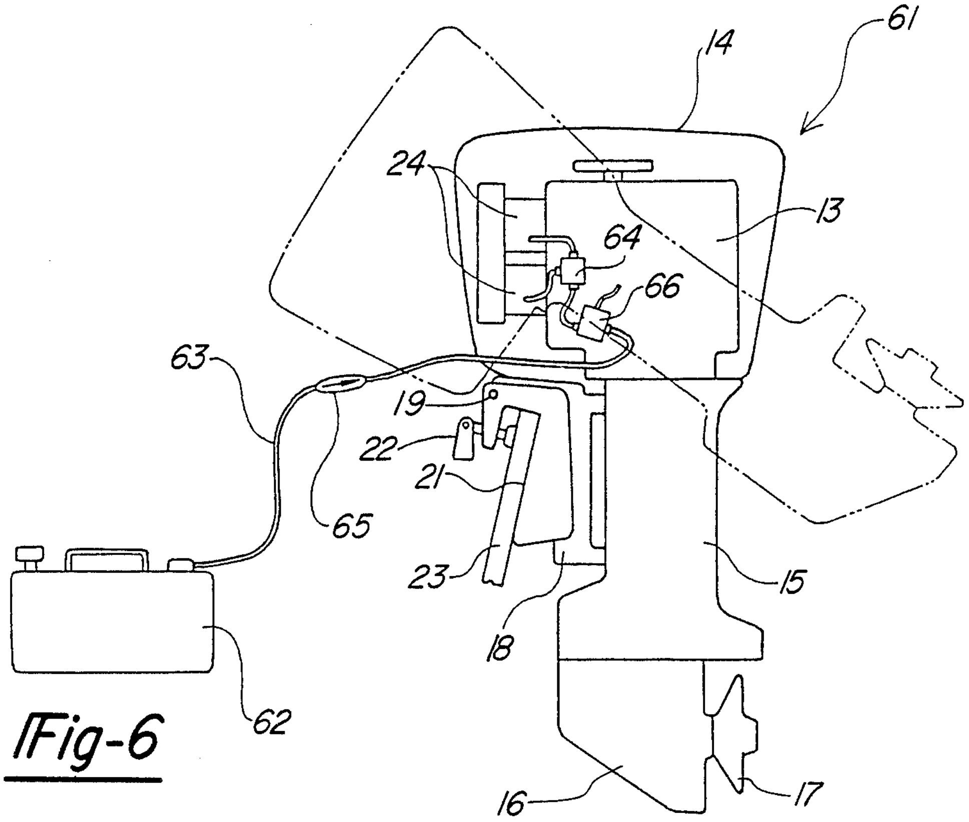
IFig-6
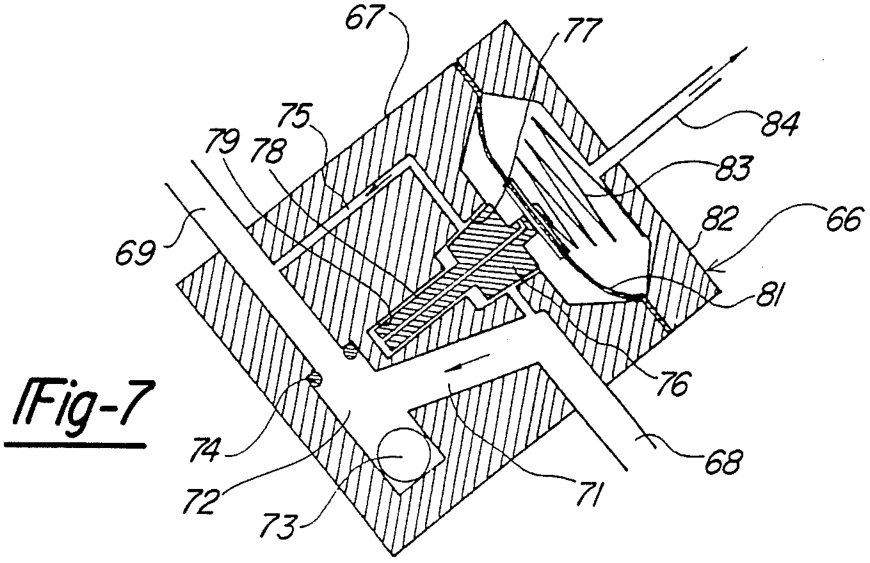
IFig-7

FUEL SUPPLYING SYSTEM OF OUTBOARD MOTOR

BACKGROUND OF THE INVENTION

This invention relates to a fuel supplying system for an outboard motor and more particularly to an improved system for preventing the flow of fuel to the charge former of an outboard motor when the outboard motor is tilted up and an improved valve for precluding such flow.

Outboard motors are conventionally mounted for tilting movement about a horizontally disposed tilt axis from a normal running condition to a tilted up condition. When the motor is in its tilted up condition, it is important to ensure that fuel is not delivered to the engine charge former since the outboard motor will not be running under this condition. If fuel is supplied to the charge former when the outboard motor is tilted up and the engine is not running, fuel spillage and attendant problems can result.

One way in which the flow of fuel to the charge former of an outboard motor from its fuel tank can be precluded when the outboard motor is tilted up is by employing a gravity responsive type of check valve in the conduit connecting the fuel tank to the charge former. However, if such a check valve is employed, the pressurization which may occur in the line when the outboard motor is tilted up will continue when the outboard motor is tilted back down to its normal running condition, and it may be impossible to deliver fuel to the engine for normal running. Even if the pressure is relieved externally, the engine suction may prevent opening of the valve.

It is, therefore, an object of this invention to provide an improved valve for precluding the flow of fuel to an outboard motor when it is tilted up.

It is another object of this invention to provide an improved valve for preventing the flow of fuel to an outboard motor when it is tilted up and for ensuring flow of the fuel to the motor upon its being tilted back down to its normal running condition.

A feature of this invention is adapted to be embodied in a fuel supply system for an outboard motor having a charge former, a fuel tank and conduit means interconnecting the fuel tank with the charge former. The outboard motor is supported for pivotal movement about a generally horizontally extending tilt axis between a normal running position and a tilted up position. In accordance with the invention, valve means are provided for precluding flow through the conduit means to the charge former in response to movement of the outboard motor to its tilted up position. This valve means further includes means for relieving the pressure in the portion of the conduit means between the charge former and the valve means upon tilting of the outboard motor back to its normal running position. The means for relieving pressure includes a pressure responsive valve that is responsive to a pressure other than the pressure in the conduit portion.

BRIEF DESCRIPTION OF THE DRAWINGS

FIG. 6 is a side elevational view of an outboard motor constructed in accordance with a second embodiment of the invention.

FIG. 7 is a cross-sectional view showing the fuel shut-off valve of this embodiment in the tilted down condition.

DETAILED DESCRIPTION OF THE PREFERRED EMBODIMENTS

Embodiment of FIGS. 1 Through 5

Figure 1:
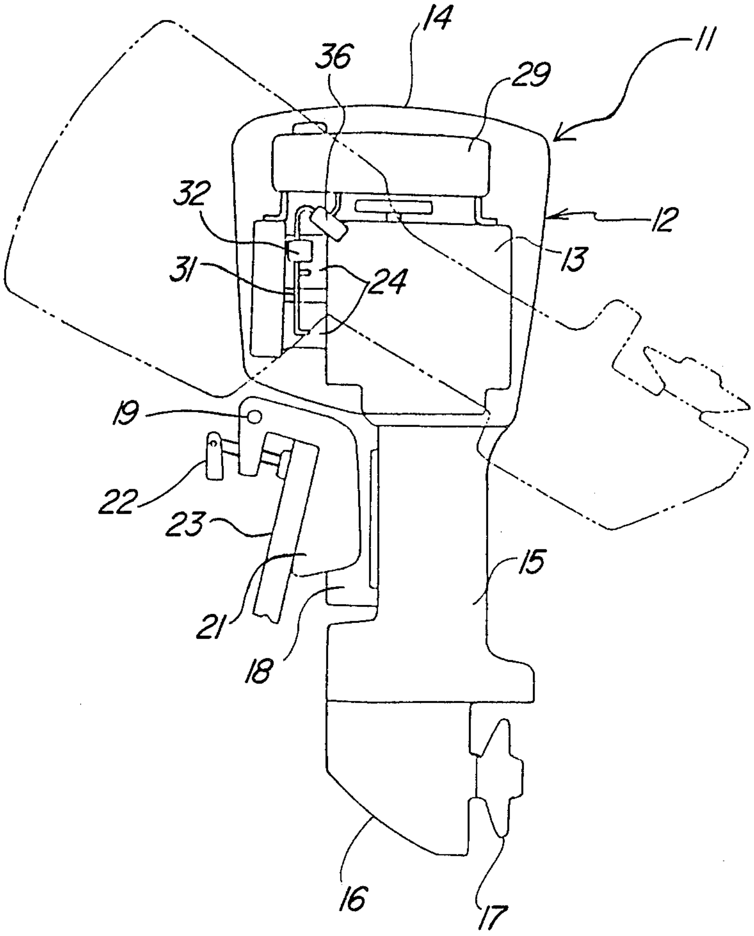
FIG. 1 is a side elevational view of an outboard motor constructed in accordance with a first embodiment of the invention.

An outboard motor constructed in accordance with a first embodiment of the invention is identified generally by the reference numeral 11. The outboard motor 11 includes a power head, indicated generally by the reference numeral 12, which includes an internal combustion engine 13 and a surrounding protective cowling 14. A drive shaft housing 15 depends from the power head 12 and contains a drive shaft (not shown) that is driven by the engine output shaft in a known manner. A lower unit 16 is formed at the lower end of the drive shaft housing 15 and contains a forward, neutral, reverse transmission for driving a propeller 17 from the engine driven drive shaft in a known manner.

A steering shaft (not shown) is affixed to the drive shaft housing 15 and is journaled in a swivel bracket 18 for steering of the outboard motor 11 about a generally vertically extending steering axis. The swivel bracket 18 is, in turn, pivotally connected by means of a pivot pin 19 to a clamping bracket 21 for tilting movement of the outboard motor 11 between a normal running position, as shown in solid lines in FIG. 1, and a tilted up condition, as shown in phantom lines. The clamping bracket 21 carries an appropriate clamping device 22 for attachment to a transom 23 of an associated watercraft.

The engine 13, which is depicted as being of the two-cycle, crankcase compression type, is provided with a charge forming device in the form of a pair of carburetors 24. The carburetors 24 have float bowls 25 (FIG. 2) to which fuel is delivered by means of a needle valve 26 that is operated by a float 27 to provide a uniform head of fuel in the fuel bowl 25. The fuel is discharged into the induction system of the engine through a main fuel discharge 28. Since the construction of the carburetors 24 and engine 13 forms no part of the invention, these components will not be described in any further detail and any of the well known types of engines and charge formers may be employed.

A fuel tank 29 is positioned within the protective cowling 14 and is supported by the engine 13 above the charge formers 24 for gravity supply of fuel. A conduit 31 is provided for delivering fuel from the fuel tank 29 to a fuel filter 32 for subsequent delivery to the carburetors 24.

It should be readily apparent that when the motor 11 is tilted up, it is desirable to ensure against the passage of fuel from the fuel tank 29 to the carburetors 24. Such fuel delivery would be possible either by heating of the fuel in the tank 29 causing expansion and pressurization of the conduit 31 and by the gravity forces.

If fuel tank 29 is provided with a filler neck 33 on which a removable filler cap 34 is provided so as to permit replenishment of the fuel within the tank 29. The filler cap 34 may be accessible through an opening panel in the outer cowling 14 or, alternatively, may extend through the outer cowling 14. An air venting valve 35 is also provided in the upper portion of the fuel tank 29 in proximity to the filler neck 33 so as to permit air to flow into the tank 29 to replace the volume of fuel consumed during operation.

In order to prevent the unwanted discharge of fuel from the tank 29 into the carburetors 24 when the motor is tilted up and not in use, there is provided a position responsive valve, indicated generally by the reference numeral 36 which is in the conduit 31 between the fuel tanks 29 and the fuel filter 32.

The position responsive valve 36 includes a valve body 37 that is suitably fixed to the engine 13 or some other component within the protective cowling 14 and which has an inlet fitting 38 and an outlet fitting 39. The fittings 38 and 39 communicate with the conduit 31 as clearly shown in FIG. 2.

The inlet fitting 38 intersects a cavity 41 formed in the valve body 37. In addition, one end of the cavity 41 communicates with the outlet fitting 39 and an O-ring seal 42 is provided at this point. A valve member having a first portion 43 is adapted to cooperate with the O-ring seal 42 when the outboard motor 11 is tilted up so as to prevent the unwanted flow of fuel, as will become apparent.

Figure 2:
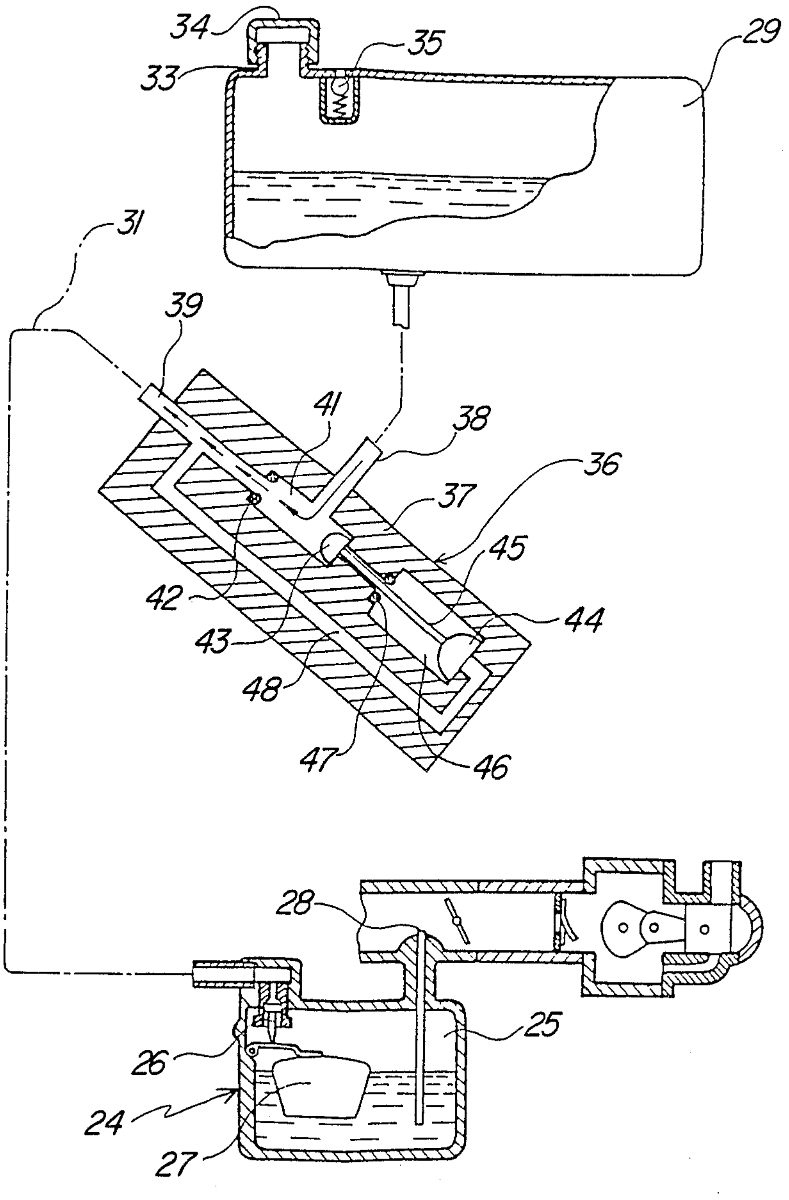
FIG. 2 is a partially schematic cross-sectional view showing the charge former and fuel supply system of the embodiment of FIG. 1, when the outboard motor is in its normal running condition.

The valve element 43 is connected to a further valve element 44 by an elongated rod 45. The valve element 44 is positioned within a cavity 46 which is aligned with and vertically below the cavity 41 when the outboard motor is in a tilted down normal running condition as shown in FIG. 2. The valve element 49 cooperates with an O-ring valve seat 47 which encircles the rod 45 with a clearance. The rod 45 also extends through a passageway which connects the chamber 41 with the chamber 46. It should be also noted that the external diameter of the valve element 44 is substantially the same as the bore of the chamber 46, for a reason to become apparent.

A pressure relief passageway 48 interconnects the chamber 46 with the outlet fitting 39 between the O-ring valve seat 42 and the discharge of the fitting 39.

Operation of this embodiment may be best understood by reference to FIGS. 2–5. As as been noted, FIG. 2 shows the normal running condition. Under this condition, the valve members 43 and 44 and interconnecting rods 45 were moved by gravity from the position shown in FIG. 2 and neither of the valve seats 42 and 47 will be contacted. The flow of fuel will then be permitted through the conduit 31 from the inlet fitting 38, through the chamber 41 and to the outlet fitting 39. There will be substantially no flow through the pressure relief passage 48 under this condition.

Figure 3:
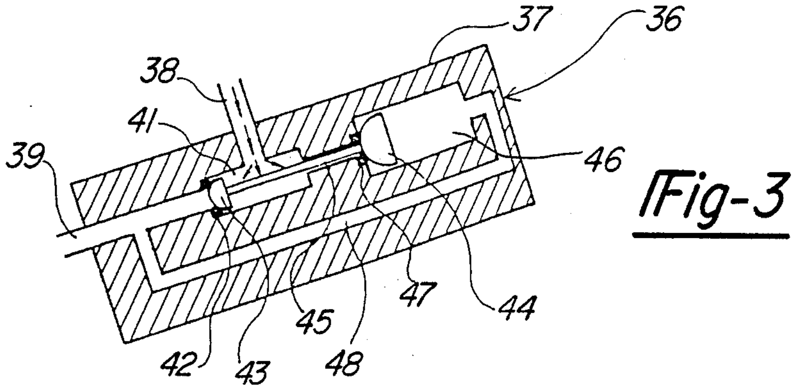
FIG. 3 is a partial view, in part similar to FIG. 2, showing the condition when the outboard motor is tilted up.
Figure 4:
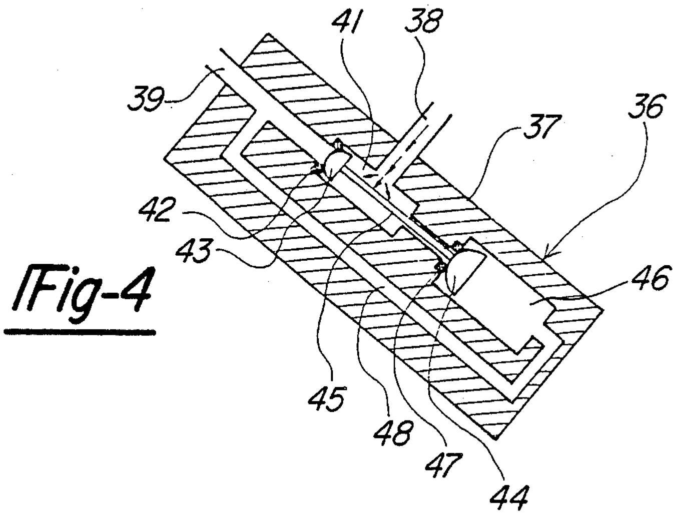
FIG. 4 is a partial cross-sectional view, in part similar to FIG. 3, showing the condition when the outboard motor is first tilted down.
Figure 5:
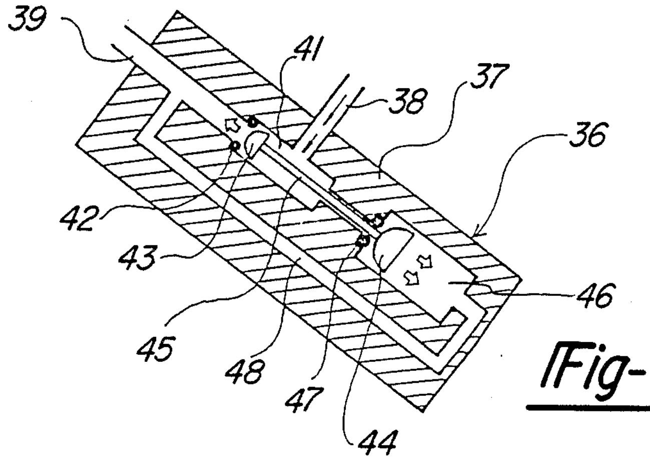
FIG. 5 is a cross-sectional view, in part similar to FIGS. 3 and 4, showing how the pressure relief occurs after tilting down.

When the outboard motor 11 is tilted up, the valve 36 assumes the position as shown in FIG. 3. Under this condition, the valve members 43 and 44 and connecting rod 45 will move by the force of gravity so that the valve members 43 and 44 contact the valve seats 42 and 47 respectively. It should be noted that the length of the rod 45 is such that both valve seats are engaged simultaneously. Hence, the flow of fuel from the inlet fitting 38 to the outlet fitting 39 will be effectively blocked. It should be noted that the effective seating areas of the two valves is substantially equal so that the fluid pressure which build up in the inlet fitting 38 cannot cause unseating of the valve members 43 and 44. Hence, inadvertent fuel flow to the carburetors 24 will be precluded under this condition.

When the outboard motor 11 is tilted down again to its normal position (FIG. 4) any fuel pressure in the inlet fitting 38 will tend to cause the valve members 43 and 44 to be maintained in their closed position. Hence, restarting of the engine can be a problem except for the operation now to be described.

When the engine is being cranked, there will be a negative pressure or suction existing in the outlet fitting 39, and this pressure acts on the valve member 43 tending to hold it in a closed position, but also upon the valve member 44 through the pressure relief passage 48 to urge it toward its open position. Since the valve member 44 is closely fitted within the chamber 46 and this has a larger area than the valve seat 44, the pressure of suction will cause the valve member 44 to move downwardly away from the seat 47, and this movement is transmitted through the rod 45 to the valve member 43 to draw it away from its seat 42 and permit the normal flow of fuel. Once this occurs, the weight of the valve members 43, 44 and connecting rod 45 will cause the valve to again open fully as shown in FIG. 3 in normal running is possible.

Embodiment of FIGS. 6 Through 9

Going first to FIG. 6, an outboard motor constructed in accordance with another embodiment of the invention is identified generally by the reference numeral 61. The basic construction of the outboard motor 61 and its association with the watercraft is the same as the outboard motor 11 in FIG. 1. For that reason, components which are the same or substantially the same have been identified by the same reference numeral and will be described again only in so far as is necessary to understand the construction in operation this embodies.

This embodiment, rather than having the fuel tank provided within the protective cowling 14, a remotely positioned fuel tank 62 is provided. It is to be understood that the embodiment of FIGS. 1 through 5 may also be utilized in conjunction with such a remotely positioned fuel tank. A conduit 63 interconnects the fuel tank 62 with an engine driven fuel pump 64 of the engine. A bulb type priming pump 65 is provided in the conduit 63 for priming of the fuel pump 64. As with the previously described embodiment, tilting up of the outboard motor could cause fuel to be inadvertently delivered to the carburetors 24 when the engine is not running because of expansion of the fuel in the tank 62. In addition, inadvertent operation of the priming pump 65, as by stepping on it, could cause it to accidentally discharge fuel. Therefore, a position responsive valve, indicated generally by the reference numeral 66 and shown in most detail in FIGS. 7 through 9 is provided for precluding flow under these conditions.

Figure 8:
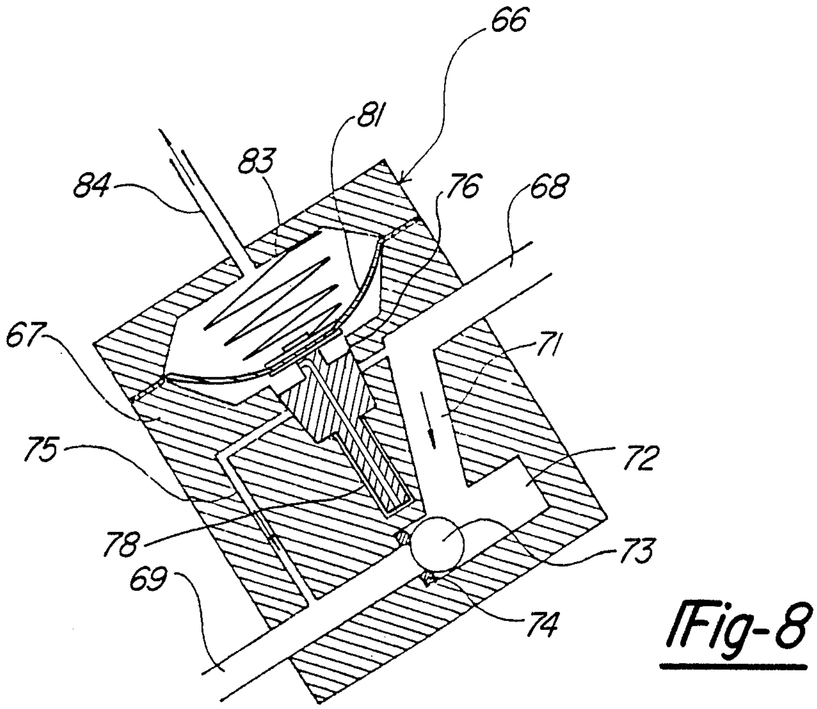
FIG. 8 is a cross-sectional view, in part similar to FIG. 7, showing the fuel shut-off valve in the tilted up condition.
Figure 9:
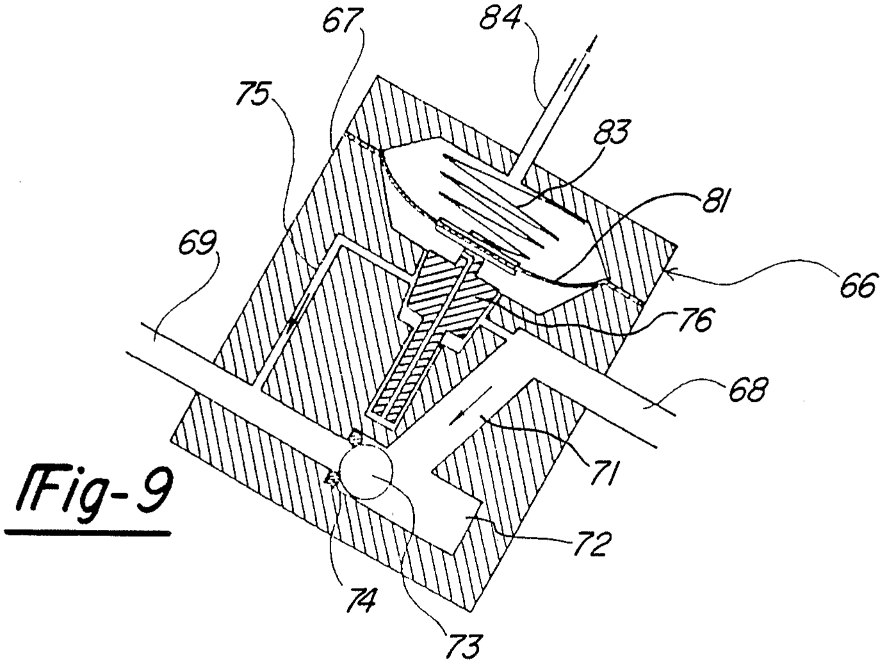
FIG. 9 is a cross-sectional view, in part similar to FIGS. 7 and 8, showing the fuel shut-off valve when returned to the tilted down condition and when the engine is being cranked so as to achieve pressure relief.

Referring now to FIGS. 7 through 9, the position responsive valve 66 includes a valve body 67 that has an inlet fitting 68 and an outlet fitting 69. Internal passageway 71 connects the inlet fitting 68 with a chamber 72 in which a ball-type valve 73 is received. The chamber 72 communicates with the outlet fitting 69 and an O-ring valve seat 78 is provided in the area of this communication. FIG. 7 shows the normal running position and the ball valve 73 has moved by its own weight away from the seat 74 so as to permit fuel flow from the inlet fitting 68 to the outlet fitting 69.

When the outboard motor 61 is tilted up, the ball-type check valve 73 will move into engagement with the seat 74 and will preclude flow. However, it should be noted that the pressurization of the inlet fitting 68 and passage 71 will create a pressure in the chamber 72 which tends to hold the valve 73 in a closed position when the outboard motor is again tilted down. An arrangement is provided for relieving this pressure and this includes a pressure relief passageway 75 that extends from the passage 71 to a point downstream of where the chamber 72 communicates with the discharge fitting 69. A pressure relieving and pressure responsive valve member 76 has a generally conical configuration that is received within a complementary tapered bore 77 which is intersected by the passageway 75. The valve member 76 has a cylindrical stem portion 78 that is sliding supported within a bore 79 formed in the valve body 67.

The pressure responsive valve member 76 is operated by means of a diaphragm 81 that is clamped between the body portion 67 and a cover plate 82 of the valve housing. A light coil compression spring 83 is received in a chamber on the upper side of the diaphragm 81 for normally urging the diaphragm 81 and valve member 76 to a downward position wherein the valve member 76 will engage the bore 77 and preclude flow through the passageway 75.

The chamber on the upper side of the diaphragm 81 is vented to induction system suction by means of a suction port 84. The suction port 84 may communicate with either the intake manifold of the engine or, in view of the fact that the engine 13 is of the two-cycle crankcase compression type, with one of its crankcase chambers. Hence, when the engine is running or is being cranked, there is a suction developed in the chamber over the diaphragm 81 which will overcome the action of the spring 83 and move the valve member 76 to an open position.

Continuing now with the operation of this embodiment, when the outboard motor 61 is tilted up, the valve member 73 will engage the valve seat 74 and preclude the flow of fuel. At the same time, the action of the spring 83 will urge the valve member 76 downwardly so as to close the pressure relief passage 75, and no fuel can flow from the fuel tank 62 to the carburetor 24 even if the bulb 65 is inadvertently pressed.

When the outboard motor 61 is again tilted down, the pressurization in the inlet fitting 68 will tend to hold the ball valve 73 in its closed position. However, the engine is cranked, there will be suction exerted in the section port 84 which will cause the diaphragm 81 to move upwardly compressing the spring 83 and opening the valve member 76 (FIG. 9). Then, fuel pressure may be relieved through the pressure relief passageway 75 and the ball 73 can fall back to its open position for free fuel flow.

It should be noted that during normal engine running the diaphragm 81 will be moved upwardly as shown in FIG. 7, and the valve member 76 will be open so that there can be some small amount of fuel flow through the pressure relief passage 75.

It should be readily apparent from the foregoing description that a number of embodiments of the invention have been illustrated and described and each of which operate in a highly effective manner so as to prevent inadvertent fuel discharge when an outboard motor is tilted up and which readily permit fuel to flow when the engine is tilted down and cranked. Although a number of embodiments have been illustrated and described, various other changes and modifications may be made without departing from the spirit and scope of the invention, as defined by the appended claims.

What is claimed is:

1. In an outboard motor and a fuel supply system for said outboard motor, said outboard motor having an engine and an induction system comprising a charge former, said outboard motor being supported for pivotal movement about a generally horizontally extending tilt axis between a normal running position and a tilted up position, a fuel tank, conduit means extending from said fuel tank to said charge former for delivering fuel thereto, and position responsive valve means for precluding flow to said charge former from said fuel tank when said outboard motor is in its tilted up position, the improvement comprising means including pressure responsive valve means for relieving the pressure in the portion of said conduit means between siad position responsive valve means and said fuel tank in response to a pressure downstream of said position responsive valve means.

2. The improvement as claimed in claim 1, wherein the pressure responsive valve means is responsive to an engine suction.

3. The improvement as claimed in claim 2, wherein the engine suction is supplied from a conduit of the engine.

4. The improvement as claimed in claim 2, wherein the suction is the suction of the induction system.

5. The improvement as claimed in claim 4, wherein the engine is of two-cycle crankcase compression type and the suction is crankcase suction.

6. The improvement as claimed in claim 1, wherein the position responsive valve means and the pressure responsive valve means comprise a valve housing having an inlet fitting in communication with the fuel tank and an outlet fitting in communication with the charge former, a first chamber formed in said valve housing and in communication with said inlet fitting and said outlet fitting, a first valve member cooperative with a valve seat for precluding flow through said first chamber, a second chamber formed in said valve housing, a passageway communicating said second chamber with said first chamber, a second valve member positioned within said second chamber and controlling the flow through said passageway, said first valve member and said second valve member being mechanically coupled to each other, and a pressure relief passageway extending from said second chamber to said outlet fitting, said second valve member having a larger effective area in said second chamber than that cooperating with said passageway for movement of said second valve member and said first valve member from a closed position to an open position in response to engine suction.

7. The improvement as claimed in claim 1, wherein the position responsive valve means and the pressure responsive valve means comprise a housing having a first chamber, an inlet to said first chamber communicating with said conduit means, an outlet from said first chamber communicating with said conduit means, a gravity responsive valve for controlling the flow through said chamber, a pressure relief passage extending between said inlet and said outlet for bypassing said chamber, a valve element movable between an open position and a closed position for controlling the flow through said bypass passage, a pressure responsive member for actuating said valve element, and a second chamber formed in said valve housing and receiving said pressure responsive member.

8. The improvement as claimed in claim 7, wherein the pressure responsive member comprises a diaphragm affixed to the valve element.

9. The improvement as claimed in claim 8, wherein the engine of the outboard motor is a crankcase compression two-cycle engine and the second chamber is communicated with the crankcase of that engine.

* * * * *